(12) United States Patent
Mueller

(10) Patent No.: US 10,409,140 B2
(45) Date of Patent: Sep. 10, 2019

(54) METHOD FOR MULTI-LONGITUDINAL MODE CONTINUOUS WAVE OUTPUT BASED ON MULTI-MODE RESONANT OPO TECHNOLOGY

(71) Applicant: Qioptiq Photonics GmbH & Co. KG, Goettingen (DE)

(72) Inventor: Frank Mueller, Munich (DE)

(73) Assignee: Qioptiq Photonics GmbH & Co. KG, Goettingen (DE)

( * ) Notice: Subject to any disclaimer, the term of this patent is extended or adjusted under 35 U.S.C. 154(b) by 0 days.

(21) Appl. No.: 16/379,180

(22) Filed: Apr. 9, 2019

(65) Prior Publication Data

US 2019/0235349 A1 Aug. 1, 2019

Related U.S. Application Data

(62) Division of application No. 15/809,572, filed on Nov. 10, 2017.

(60) Provisional application No. 62/561,428, filed on Sep. 21, 2017.

(51) Int. Cl.
*G02F 1/39* (2006.01)
*G02F 1/35* (2006.01)

(52) U.S. Cl.
CPC .............. *G02F 1/39* (2013.01); *G02F 1/3501* (2013.01); *G02F 1/3532* (2013.01); *G02F 2001/3503* (2013.01); *G02F 2001/3507* (2013.01); *G02F 2001/392* (2013.01)

(58) Field of Classification Search
CPC ............................... G02F 1/39; G02F 2001/392
See application file for complete search history.

(56) References Cited

U.S. PATENT DOCUMENTS

| | | | |
|---|---|---|---|
| 5,144,629 | A | 9/1992 | Basu |
| 5,663,973 | A | 9/1997 | Stamm et al. |
| 5,796,513 | A | 8/1998 | Stamm et al. |
| 5,894,489 | A | 4/1999 | Halldorsson |
| 5,999,547 | A | 12/1999 | Schneider et al. |

(Continued)

FOREIGN PATENT DOCUMENTS

| | | |
|---|---|---|
| AT | 524763 | 9/2001 |
| AT | 369641 | 8/2007 |

(Continued)

OTHER PUBLICATIONS

2010 / vol. 18, No. 3 / Optics Express 2361.

(Continued)

*Primary Examiner* — Daniel Petkovsek
(74) *Attorney, Agent, or Firm* — Peter A. Nieves; Sheehan Phinney Bass & Green PA

(57) ABSTRACT

A method of producing a broadband and/or multi-mode emission light source utilizing an Optical Parametric Oscillator (OPO) includes providing a pump source configured to produce a continuous wave pump beam, providing an OPO with an optical cavity containing a nonlinear crystal configured to receive the continuous wave pump beam and produce a first output light beam and a second output light beam. The OPO has an OPO-oscillation threshold level and produces longitudinal mode-scrambling on a resonant OPO-wave. The first output light resonates in the optical cavity in a multi-longitudinal resonant mode and produces a pump beam having a power at least three times the OPO-oscillation threshold.

9 Claims, 3 Drawing Sheets

(56) References Cited

U.S. PATENT DOCUMENTS

| | | |
|---|---|---|
| 6,088,379 A | 7/2000 | Owa et al. |
| 6,108,356 A | 8/2000 | Yin et al. |
| 6,249,371 B1 | 6/2001 | Masuda et al. |
| 6,683,894 B1 | 1/2004 | Lee et al. |
| 6,731,660 B2 | 5/2004 | Arbore et al. |
| 6,757,096 B2 | 6/2004 | Schiller |
| 6,798,502 B2 | 9/2004 | Hunt |
| 6,856,737 B1 | 2/2005 | Parker et al. |
| 6,870,664 B2 | 3/2005 | Jovanovic et al. |
| 6,898,218 B2 | 5/2005 | McCarthy |
| 7,136,402 B1 | 11/2006 | Ohtsuki |
| 7,151,787 B2 | 12/2006 | Kulp et al. |
| 7,248,397 B1 | 7/2007 | Armstrong et al. |
| 7,280,268 B2 | 10/2007 | Lucht et al. |
| 7,599,408 B2 | 10/2009 | Vachss |
| 7,706,054 B2 | 4/2010 | Rae et al. |
| 7,801,188 B2 | 9/2010 | Karlsson et al. |
| 8,120,778 B2 | 2/2012 | Fermann et al. |
| 8,237,122 B2 | 8/2012 | Fermann et al. |
| 8,369,003 B2 | 2/2013 | Lin et al. |
| 8,699,532 B2 | 4/2014 | Fermann et al. |
| 8,774,236 B2 | 7/2014 | Ter-Mikirtychev |
| 8,780,946 B2 | 7/2014 | Tokuhisa |
| 8,817,827 B2 | 8/2014 | Ter-Mikirtychev |
| 8,830,565 B2 | 9/2014 | Dun et al. |
| 8,837,550 B2 | 9/2014 | Shapira et al. |
| 8,929,406 B2 | 1/2015 | Chuang et al. |
| 9,099,837 B2 | 8/2015 | Miesak et al. |
| 9,252,560 B2 | 2/2016 | Fermann et al. |
| 9,318,869 B2 | 4/2016 | Chuang et al. |
| 9,529,182 B2 | 12/2016 | Chuang et al. |
| 9,698,559 B2 | 7/2017 | Fermann et al. |
| 9,748,729 B2 | 8/2017 | Chung et al. |
| 9,804,101 B2 | 10/2017 | Deng et al. |
| 2005/0047702 A1 | 3/2005 | Parker et al. |
| 2006/0045145 A1 | 3/2006 | Arahira et al. |
| 2007/0025662 A1 | 2/2007 | Gugel |
| 2007/0110442 A1 | 5/2007 | Peer |
| 2011/0058248 A1 | 3/2011 | Vodopyanov et al. |
| 2012/0081694 A1 | 4/2012 | Fermann et al. |
| 2012/0195333 A1 | 8/2012 | Huang et al. |
| 2014/0050234 A1 | 2/2014 | Ter-Mikirtychev |
| 2014/0071406 A1 | 3/2014 | Manni et al. |
| 2017/0063026 A1 | 3/2017 | Chuang et al. |
| 2018/0024414 A1 | 1/2018 | Mueller |

FOREIGN PATENT DOCUMENTS

| | | |
|---|---|---|
| AT | 427518 | 4/2009 |
| CA | 2616667 | 2/2006 |
| CA | 2731163 | 2/2010 |
| DE | 19624865 | 3/1997 |
| DE | 19619483 | 11/1997 |
| DE | 69802122 | 3/2002 |
| DE | 10152507 | 10/2002 |
| DE | 60035821 | 1/2008 |
| DE | 60326960 | 5/2009 |
| DE | 112015004544 | 8/2017 |
| EP | 857997 | 8/1998 |
| EP | 1037338 | 8/2003 |
| EP | 1517173 | 3/2005 |
| EP | 1530744 | 1/2009 |
| EP | 2309325 | 4/2011 |
| EP | 1771765 | 9/2011 |
| EP | 2662940 | 11/2013 |
| EP | 2949015 | 12/2015 |
| EP | 3096182 | 11/2016 |
| EP | 3096183 | 11/2016 |
| GB | 0416673 | 8/2004 |
| GB | 0813980 | 9/2008 |
| GB | 2449968 | 10/2008 |
| GB | 0809788 | 10/2009 |
| JP | H10341054 | 12/1998 |
| JP | 2000261081 | 9/2000 |
| JP | 2002099011 | 4/2002 |
| JP | 3514073 | 3/2004 |
| JP | 2006066586 | 3/2006 |
| JP | 4147365 | 9/2008 |
| JP | 2014504746 | 2/2014 |
| JP | 2016508620 | 3/2016 |
| JP | 2016508627 | 3/2016 |
| JP | 5933591 | 5/2016 |
| JP | 6050684 | 12/2016 |
| JP | 2016206390 | 12/2016 |
| JP | 2017509923 | 4/2017 |
| KR | 20130119416 | 10/2013 |
| KR | 20140039145 | 4/2014 |
| KR | 20150109472 | 10/2015 |
| KR | 20150119040 | 10/2015 |
| KR | 20160135790 | 11/2016 |
| KR | 20170066554 | 6/2017 |
| TW | 201111890 | 4/2011 |
| TW | 201208220 | 2/2012 |
| TW | I408481 | 9/2013 |
| TW | 201444209 | 11/2014 |
| TW | 201448384 | 12/2014 |
| TW | 201539905 | 10/2015 |
| TW | 201614916 | 4/2016 |
| WO | 2001020397 | 3/2001 |
| WO | 2004000163 | 12/2003 |
| WO | 2006010916 | 2/2006 |
| WO | 2010013003 | 2/2010 |
| WO | 2011158927 | 12/2011 |
| WO | 2012092362 | 7/2012 |
| WO | 2012126495 | 9/2012 |
| WO | WO2011158927 | 8/2013 |
| WO | 2014028353 | 2/2014 |
| WO | 2014074136 | 5/2014 |
| WO | 2014116922 | 7/2014 |
| WO | 2014127100 | 8/2014 |
| WO | 2015143152 | 9/2015 |
| WO | 2016054589 | 4/2016 |
| WO | 2017042439 | 3/2017 |

OTHER PUBLICATIONS

Lin, et al; Fiber-laser-pumped CW OPO for Red, Green, Blue Laser Generation; 2010 / vol. 18, No. 3 / Optics Express 2361 published Jan. 21, 2010.

International Search Report for PCT/US18/51401, dated Dec. 17, 2018.

International Search Report for PCT/US18/51405, dated Dec. 20, 2018.

Westphal, et al "Laser-diode-stimulated emission depletion microscopy," Applied Physics Letters, vol. 82, No. 8, May 5, 2003.

_US 10,409,140 B2_

METHOD FOR MULTI-LONGITUDINAL MODE CONTINUOUS WAVE OUTPUT BASED ON MULTI-MODE RESONANT OPO TECHNOLOGY

CROSS-REFERENCE TO RELATED APPLICATIONS

This application is a divisional of co-pending U.S. patent application Ser. No. 15/809,572, filed Nov. 10, 2017, entitled "LIGHT SOURCE WITH MULTI-LONGITUDINAL MODE CONTINUOUS WAVE OUTPUT BASED ON MULTI-MODE RESONANT OPO TECHNOLOGY," and claims the benefit of U.S. Patent Application Ser. No. 62/561,428, filed Sep. 21, 2017, entitled "LIGHT SOURCE WITH MULTI-LONGITUDINAL MODE CONTINUOUS WAVE OUTPUT BASED ON MULTI-MODE RESONANT OPO TECHNOLOGY," both of which are incorporated by reference herein in their entirety.

FIELD OF THE INVENTION

The present invention generally relates to a light source providing multi-longitudinal resonant waves, and more particularly, is related to a light source which utilizes an optical parametric oscillator (OPO) to produce a broadband emission spectrum.

BACKGROUND

An optical parametric oscillator (OPO) is a light source emitting radiation with properties comparable to that of a laser. OPOs are nonlinear devices that split short wavelength pump photons into two longer wavelength photons, namely signal and idler photons. The wavelengths of the signal and idler photons are not independent from each other, but may be tuned in wavelength.

As shown by FIG. 1, an OPO converts an input laser wave (the "pump") with frequency $\omega_p$ into two output waves of lower frequency ($\omega_s$, $\omega_i$) via second-order nonlinear optical interaction. The sum of the frequencies of the output waves is equal to the input wave frequency: $\omega_s + \omega_i = \omega_p$. For historic reasons, the output wave with the higher frequency $\omega_s$ is called the signal, and the output wave with the lower frequency co, is called the idler. Because the OPO does not convert all the input energy into the signal and idler, a residual pump wave is also output.

OPOs need an optical resonator, but in contrast to lasers, OPOs are based on direct frequency conversion in a non-linear crystal rather than from stimulated emission. OPOs exhibit a power threshold for an input light source (pump), below which there is negligible output power in the signal and idler bands.

OPOs include an optical resonator (cavity) and a nonlinear optical crystal. The optical cavity is an arrangement of mirrors that forms a resonator for light waves. Light confined in the cavity is reflected multiple times resulting in a multi-pass through the nonlinear crystal. The optical cavity serves to resonate at least one of the signal and idler waves. In the nonlinear optical crystal, the pump, signal and idler beams overlap.

While conventional lasers produce limited fixed wavelengths, OPOs may be desirable because the signal and idler wavelengths, which are determined by the conservation of energy and momentum (via phase matching), can be varied in wide ranges. Thus it is possible to access wavelengths, for example in the mid-infrared, far-infrared or terahertz spectral region, which may be difficult to obtain from a laser. In addition, OPOs allow for wide wavelength tunability, for example, by changing the phase-matching condition. This makes OPOs a useful tool, for example, for laser spectroscopy.

In addition, while prior light sources such as spectrally filtered plasma sources and supercontinuum whitelight lasers are available, such light sources suffer from poor photon (energy) efficiency (typically a few mW output power per nm). On the other hand, OPO/non-linear optics (NLO) technology may offer significantly higher energy efficiency with more narrow band output powers of greater than 50 mW. Thus, while supercontinuum and plasma sources produce a broad spectrum from which (for many applications requiring narrower linewidths) parts are cut off, OPOs are capable of producing a tunable comparatively narrow band output (so no waste of power by filtering out). Therefore, there is a need in the industry to address one or more of the above mentioned shortcomings.

SUMMARY OF THE INVENTION

Embodiments of the present invention provide a continuous wave (cw) light source based on OPO technology, plus potential further NLO processes. In particular, while typical cw OPOs have a single longitudinal mode resonant wave, the present invention is configured to provide high power tunable wavelength broadband emissions (short coherence). According to embodiments of the present invention, an OPO is pumped far above threshold to enable a multi-mode operation of the resonant wave, potentially also generating Raman-lines. In particular, the present invention provides a multi-longitudinal mode (greater than 3 modes) resonant OPO with potentially controllable mode content plus optional longitudinal mode scrambling. The high resonant wave power produced enables further efficient intracavity NLO mixing (e.g., SHG, second harmonic generation) to generate multimode and/or broadened at wavelengths shorter than that of the resonant wave.

According to one aspect, the present invention provides a light source including a pump source configured to produce a pump beam, and an OPO having an optical cavity containing a crystal configured to receive light from the pump source and produce a first output light beam and a second output light beam, the OPO having an OPO-oscillation threshold level. In particular, the pump source is configured to produce the pump beam at a power sufficiently above the OPO-oscillation threshold such that the OPO produces broadband and/or multi-mode emission.

Embodiments according to this aspect may include one or more of the following features. The pump source may be configured to produce the pump beam at a power exceeding about 3 times the OPO-oscillation threshold. The pump source may be configured to produce the pump beam at a power exceeding about 5 times the OPO-oscillation threshold. The light source may further include a longitudinal mode-scrambling mechanism disposed on the resonant OPO-wave. The longitudinal mode-scrambling mechanism may be a mechanical scrambling mechanism. The longitudinal mode-scrambling mechanism may be selected from one or more of a dithered optical resonator length, an intra-cavity etalon, a refractive grating and a non-linear crystal, wherein the longitudinal mode-scrambling mechanism is configured to modulate a phase-matching condition and/or wavelength-dependent gain or losses of the OPO. The longitudinal mode-scrambling mechanism may be selected from one or more of an intra-cavity electro-optic phase modulator, an intra-cavity electro-optic etalon, or a nonlinear crystal, and the longitudinal mode-scrambling mechanism may be configured to electro-optically modulate the nonlinear phase-matching condition and/or wavelength-dependent gain or losses of the OPO. The light-source may further include a second nonlinear crystal within the optical resonator, wherein the second crystal is configured for additional SHG, SFG or OPO processes. The second crystal may be configured to enable the light source to access additional wavelength ranges with broadband and/or multi-mode emission having a bandwidth greater than 300 GHz. A second pump-source may be configured to pump the second nonlinear crystal.

According to another aspect, the present invention provides a method of producing a broadband and/or multi-mode emission light source utilizing an Optical Parametric Oscillator (OPO), including: providing a pump source configured to produce a pump beam; providing an Optical Parametric Oscillator (OPO) including an optical cavity containing a crystal configured to receive light from the pump source and produce a first output light beam and a second output light beam, the OPO having an OPO-oscillation threshold level; and producing a pump beam with the pump source, the pump beam having a power at least about 3 times the OPO-oscillation threshold.

Embodiments according to this aspect may include one or more of the following features. The OPO produces a broadband and/or multi-mode emission, and the method further includes longitudinal mode-scrambling on a resonant OPO-wave. The longitudinal mode-scrambling may be done mechanically. The longitudinal mode-scrambling may be carried out by dithering an optical resonator length of the OPO, providing an OPO intra-cavity etalon, providing a refractive grating, or providing a non-linear crystal, wherein the longitudinal mode-scrambling modulates the phase-matching condition and/or wavelength-dependent gain or losses of the OPO. The longitudinal mode-scrambling may be carried out by using an intra-cavity electro-optic phase modulator, an intra-cavity electro-optic etalon, or a non-linear crystal, wherein the longitudinal mode-scrambling modulates a phase-matching condition and/or wavelength-dependent gain or losses of the OPO electro-optically. The method may further include providing a second nonlinear crystal within the optical resonator, wherein the second crystal is configured to perform additional SHG, SFG or OPO processes. The second crystal may be configured to enable the light source to access additional wavelength ranges with broadband and/or multimode emission having a bandwidth greater than 300 GHz. The method may further include providing a second pump source and pumping the second nonlinear crystal with the second pump source.

The present light systems beneficially provide light generation which finds use in a variety of applications including microscopy and biotech.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principals of the invention. The components in the drawings are not necessarily to scale, emphasis instead being placed upon clearly illustrating the principles of the present invention. In the drawings, each like component is referenced by a like numeral. For purposes of clarity, every component may not be labeled in every drawing. In the drawings.

DETAILED DESCRIPTION OF THE INVENTION

Figure 1:
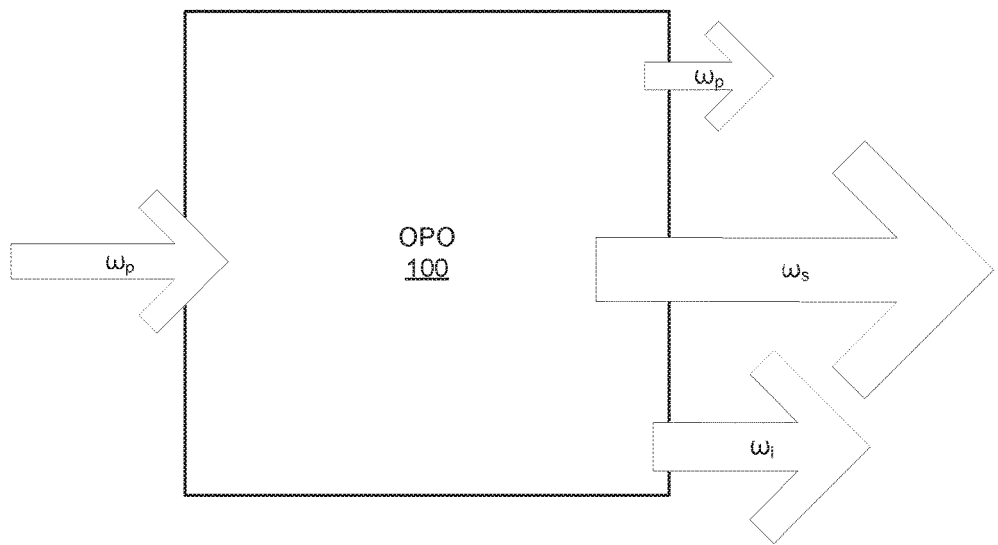
FIG. 1 is a general schematic diagram of a prior art OPO.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

Normally a light-source having more than 1 longitudinal mode is called "multi-longitudinal mode". However, as used within this disclosure, "multi-longitudinal mode" refers to a number of longitudinal modes greater than 3. A number of modes of 2 or 3 may be called "few single-modes" in this context.

As used within this disclosure, "broadband" refers to a bandwidth greater than 300 GHz, no matter if formed by multiple modes, single broadened line(s) or a spectral distribution, and no matter if before or after longitudinal mode scrambling.

As used within this disclosure, "longitudinal mode scrambling" refers to a method for fast frequency-tuning of modes, continuously or via hopping. In this context, reference to "fast" frequency tuning of modes means faster than can be timely resolved for an application. One example of a fast frequency tuning of modes is a repetition rate of greater than 100 Hz (however, this is merely an example, and it is to be understood that reference to fast frequency tuning of modes in the present invention is not limited only to values of greater than 100 Hz).

As used within this disclosure, OPO generally refers to a continuous wave OPO (cw-OPO), rather than a pulsed OPO. In general, "continuous wave" or "CW" refers to a laser that produces a continuous output beam, sometimes referred to as "free-running," as opposed to a q-switched, gain-switched or mode locked laser, which has a pulsed output beam.

As used within this disclosure, "mirror" refers to an optical element having at least one reflective surface. The reflective surface may reflect light received from one direction, but transmit light received from other directions. The reflective surface may reflect some wavelengths and transmit other wavelengths. Further the reflective surface may partially transmit and partially reflect some wavelengths.

Reference will now be made in detail to embodiments of the present invention, examples of which are illustrated in the accompanying drawings. Wherever possible, the same reference numbers are used in the drawings and the description to refer to the same or like parts.

In general, embodiments of the present invention include devices and methods for producing broadband laser radiation, particularly by using a multi longitudinal resonant mode OPO. This is in contrast with prior OPOs, which are specifically configured so as to be resonant on a single or substantially single mode. The present embodiments achieve the desired broadband laser radiation by pumping the OPO far above the oscillation threshold. Such broadband linewidth or multi-mode light sources are generally known to have short coherence length.

Figure 2:
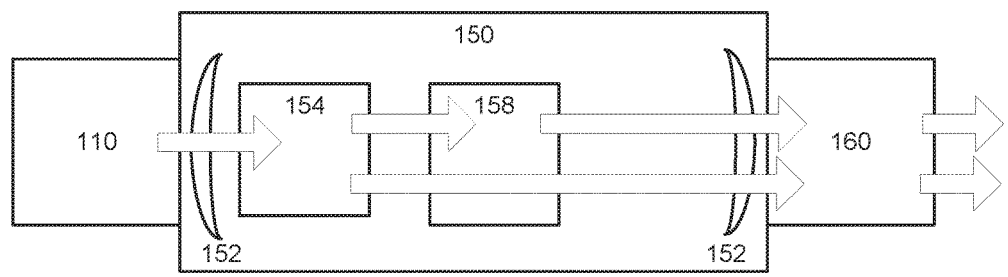
FIG. 2 is a schematic diagram of an OPO pumped by a high power pump source according to a first embodiment of the present invention.

Referring now to the various figures of the drawing wherein like reference characters refer to like parts, there is shown in FIG. 2 one embodiment of the light source in accordance with the present invention. As shown, a high power pump source 110 pumps the OPO 150, which in turn produces an emission spectrum. According to an exemplary embodiment, the high power pump source 110 may be in the form of a common high-power laser or an amplified diode or laser. The light source of the present embodiment is configured such that the whole emission spectrum of the OPO 150 is spectrally broadened and multimode. This may be accomplished by forcing the OPO to resonate on multi-modes and/or by broadening modes by pumping the OPO 150 far above the threshold to allow multi-mode OPO oscillation. As such, the high power pump source 110 may be one which delivers a power high enough to allow multi-longitudinal mode operation of the resonant OPO wave. In order to keep the resonant OPO wave single-longitudinal mode, a conventional OPO usually uses a maximum pump-power of approximately 2.5 times the OPO-oscillation threshold. According to embodiments of the present invention, in order to generate a multi-longitudinal resonant OPO wave, the pump-power preferably exceeds about 3 times the OPO-oscillation threshold. According to preferred embodiments, the pump-power exceeds about 3.5 times, more preferably about 4 times, more preferably about 5 times, and even more preferably more than 5 times the OPO-oscillation threshold. As a non-limiting example, assuming an exemplary OPO oscillation threshold of approximately 2 W, then a high-power pump source delivering between 2 and 5 Watt may keep the resonant wave being single-longitudinal mode, whereas for high-power pump levels greater than 5 Watts the resonant-wave may start being multi-longitudinal-mode and/or broadened.

As depicted in FIG. 2, the OPO 150 includes an optical resonator 152 resonant for at least one of the waves generated inside a NLO-crystal 154 configured for OPO-process. In order to increase the numbers and spacings of the modes, the embodiments may take into account a broadening of the gain curve. In particular, the NLO-crystal 154 may be provided with a sufficient broad phase-matching bandwidth (e.g. realized by using sufficiently short NLO-crystals) plus optionally a special shaped gain-curve (e.g. by using a ferroelectrically poled chirped OPO crystal or a ferroelectrically poled crystal with multi-grating along the beam path; alternatively or additionally temperature gradients along the direction of the beam-propagation may be applied to the crystal). The latter option may even enable control of a detailed shape of the emission spectrum. For example, in a crystal with chirped poling, the poling period may slightly vary along the beam-propagation resulting in a broadened gain curve for an OPO. Using a crystal with multi-grating along the beam path produces a super-positioning of gain-curves related to the different poling sections. For example, one crystal may contain several parallel chirped or multi-grating areas for wider wavelength-tuning. In some embodiments, a chirped-fanout grating may be used, having a gradual variation of poling period length along and perpendicular to the beam propagation direction.

If desired, additional scrambling means 158 for scrambling the resonant wave(s) may be provided. For example, such scrambling may be achieved by fast variation of the resonator-length or fast dithering on wavelength selecting elements (e.g. etalon, diffraction-grating, etc.). One means for further structuring the OPO gain curve, for example, is the use of a thick Etalon. Additional longitudinal mode scrambling may be taken into account as well (e.g., fast dither of cavity length or effective Etalon-thickness or a diffraction-grating or effective ferroelectric poling period lengths). A fast dither of the "cavity length" may be done mechanically, e.g. by mounting at least one of the cavity mirrors to a piezo-electric element; or it may be done by inserting an electro-optic phase modulator inside the resonator. A fast dither of the "effective Etalon thickness" may be done mechanically, for example by mounting an air-spaced etalon to a piezoelectric element or by mounting a solid etalon to a galvo which dithers its angle; or it may be done by making use of electro-optic properties of the material a solid etalon may be made of. A fast dither of a "diffraction-grating" may be done mechanically, e.g. by mounting it to a galvo which dithers its angle. The "effective ferroelectric poling period length" may be dithered mechanically by fast translation of a crystal with multi-poling periods or a fan-out poling design or a poled crystal with temperature gradient along the direction of translation; or it may be done by making use of electro-optic properties of the material of the nonlinear crystal; for both types of methods the nonlinear phase-matching conditions may be modulated. For optical materials having electro-optic properties, the refractive index n may be changed quickly by applying an electro-optic field. The OPO 150 then outputs the light to an optional spectral filter 160 which may be used to filter parts of a spectrum or change the spectral widths (for OPO-output).

Figure 3:
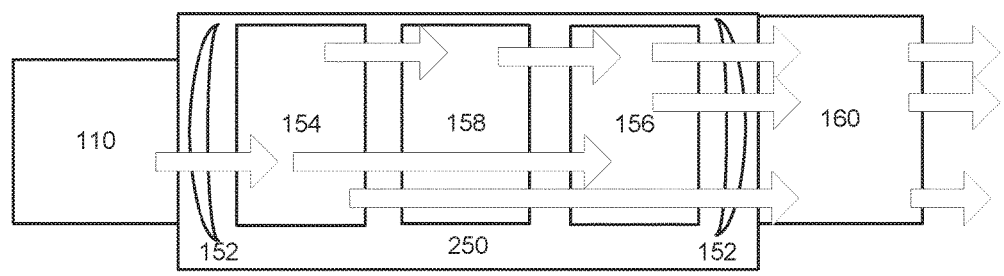
FIG. 3 is a schematic diagram of an OPO pumped by a high power pump source according to a second embodiment of the present invention.

FIG. 3 depicts another embodiment of the light source in accordance with the present invention. This embodiment is similar to that set out in FIG. 2, with an additional NLO (non-linear-optical) crystal 156 to provide further intracavity nonlinear frequency generation (for example, SFG=sum frequency generation or SHG=second harmonic generation) processes to access additional wavelength ranges. As discussed in connection with FIG. 2, a high power pump source 110 (for example, a common high-power near infrared (NIR) laser or an amplified diode or laser) pumps the OPO 250 far above the threshold to produce an emission spectrum that is spectrally broadened.

Similar to the embodiment described in connection with FIG. 2, the OPO module 250 of FIG. 3 includes an optical resonator 152 resonant for at least one of the waves generated inside the NLO-crystal 154. The second crystal 156 may be configured for SHG- and/or SFG processes involving the resonant wave(s). The crystals 154, 156 may be provided with a sufficiently large phasematching bandwidth, and may optionally have a special shaped Gain-curve (for example, by using a chirped ferroelectrically poled OPO crystal or a ferroelectrically poled crystal with multi-grating along the beam path). If desired, additional scrambling means 158 for scrambling the resonant wave(s) may be provided. For example, such scrambling may be achieved by fast variation of the resonator-length or fast dithering on wavelength selecting elements. One means for further structuring the OPO gain curve, for example, is the use of a thick Etalon. Additional longitudinal mode scrambling may be taken into account as well (for example, fast dither of cavity length or effective Etalon-thickness or a diffraction-grating or effective ferroelectric poling period lengths). A fast dither of the "cavity length" may be done mechanically, for example by mounting at least one of the cavity mirrors to a piezo-electric element; or it may be done by inserting an electro-optic phase modulator inside the resonator. A fast dither of the "effective Etalon thickness" may be done mechanically, for example by mounting an air-spaced etalon to a piezoelectric element or by mounting a solid etalon to a galvo which dithers its angle; or it may be done by making use of electro-optic properties of the material a solid etalon may be made of. A fast dither of a "diffraction-grating" may be done mechanically, for example by mounting it to a galvo which dithers its angle. The "effective ferroelectric poling period length" may be dithered mechanically by fast translation of a crystal with multi-poling periods or a fan-out poling design or a poled crystal with temperature gradient along the direction of translation; or it may be done by making use of electro-optic properties of the material the nonlinear crystal may be made of; for both types of methods the nonlinear phase-matching conditions would be modulated. For optical materials having electro-optic properties, the refractive index n may be changed quickly by applying an electro-optic field. The OPO 250 then outputs the light to an optional spectral filter 160 which may be used to filter parts of a spectrum or change the spectral widths (for OPO-/SFG-/SHG-outputs).

Figure 4:
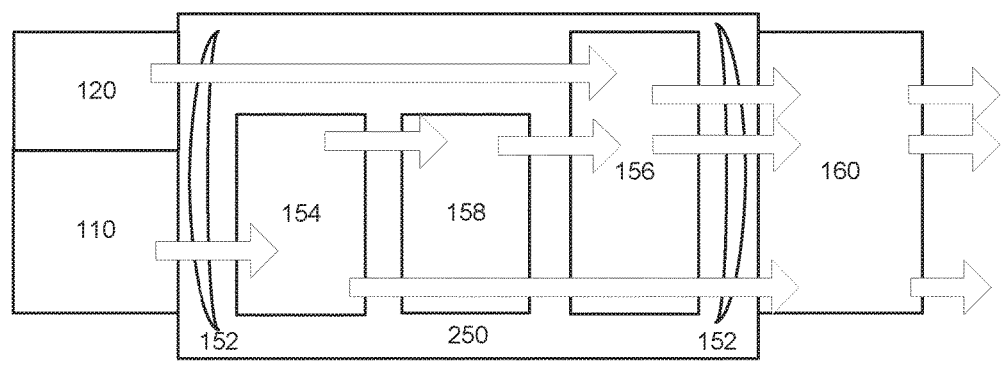
FIG. 4 is a schematic diagram of an OPO pumped by a high power pump source according to a third embodiment of the present invention.

FIG. 4 depicts another embodiment of the light source in accordance with the present invention. In contrast to FIG. 3, one SFG process may involve a resonant OPO wave and a second light source 120. This SFG output may also have smaller coherence length since the resonant OPO wave is broadband. As discussed in connection with FIGS. 2 and 3, a high power pump source 110 pumps the OPO 250 far above the threshold to produce a broadband emission spectrum.

Similar to the embodiment described in connection with FIG. 3, the OPO module 250 of FIG. 4 includes an optical resonator 152 resonant at least for one of the waves generated inside the NLO-crystal 154. A second crystal 156 is configured for SHG- and/or SFG processes involving the resonant wave(s). A SFG-process may involve a resonant wave and the second light source 120. The crystals 154, 156 may be provided with a sufficiently large phasematching bandwidth, and may optionally have a special shaped gain-curve (e.g. by using a chirped OPO crystal or a crystal with multi-grating along the beam path). If desired, additional scrambling means 158 for scrambling the resonant wave(s) may be provided. For example, such scrambling may be achieved by fast variation of the resonator-length or fast dithering on wavelength selecting elements. One means for further structuring the OPO gain curve, for example, is the use of a thick Etalon. Additional longitudinal mode scrambling may be taken into account as well (e.g., fast dither of cavity length or effective Etalon-thickness or a diffraction-grating or effective ferroelectric poling period length). The OPO 250 then outputs the light to an optional spectral filter 160 which may be used to filter parts of a spectrum or change the spectral widths (for OPO-/SFG-/SHG-outputs).

As such, the present invention provides a light source which is capable of generating tunable light of macroscopic power with a short coherence length. In particular, a pump-source with a high power level is utilized to pump an OPO with a power far above OPO-oscillation threshold level. As a result, the OPO generates two new waves, generally referred to as the signal and idler. The OPO cavity is resonant for at least one of the two new waves. According to the embodiments, the input pump-power is large enough to allow the resonant wave(s) to be multi-longitudinal mode and/or linewidth-broadened. The OPO is provided with NLO crystals having a broad phasematching bandwidth and a broadened gain-curve (e.g., by a chirped ferroelectric poling, or with multi gain peaks by using multi poling crystal chips). The light source may optionally include other elements, e.g., thick etalon for further gain shaping. If desired, additional broadening by longitudinal mode-scrambling may be carried out (e.g., by cavity-dither or etalon dither or diffraction grating dither or crystal poling period dither). Additional intracavity NLO processes (e.g., SHG of the resonant wave or SFG with the resonant wave) may optionally result in efficient generation of different wavelengths. As such, a cw-OPO resonant on multi-mode (greater than 3 modes) is provided. According to the present invention, any generation involving the resonant OPO-wave is very efficient due to the high intracavity resonant wave power. For example, for some OPOs the power-level of a resonant OPO wave may exceed 10 W, 100 W or even 1000 W. Beneficially, the light source of the present invention is capable of efficiently producing radiation in the VIS/IR wavelength ranges. Such a light system is capable of generating light suitable for applications including microscopy and biotech.

In view of the foregoing, it is intended that the present invention cover modifications and variations of this invention provided they fall within the scope of the following claims and their equivalents.

What is claimed is:

1. A method of producing a broadband and/or multi-mode emission light source utilizing an Optical Parametric Oscillator (OPO), comprising the steps of:
providing a pump source configured to produce a continuous wave pump beam;
providing an OPO comprising an optical cavity containing a nonlinear crystal configured to receive the continuous wave pump beam and produce a first output light beam and a second output light beam, the OPO having an OPO-oscillation threshold level and comprising longitudinal mode-scrambling on a resonant OPO-wave;
resonating the first output light in the optical cavity in a multi-longitudinal resonant mode; and
producing a pump beam with the pump source, the pump beam having a power at least about three times the OPO-oscillation threshold.

2. The method of claim 1, where the longitudinal mode-scrambling is done mechanically.

3. The method of claim 2, where the longitudinal mode-scrambling comprises mounting a mirror of the optical cavity to a piezo-electric element.

4. The method of claim 1, wherein the longitudinal mode-scrambling is carried out by dithering an optical resonator length of the OPO, providing an OPO intra-cavity etalon, providing a refractive grating, or providing a non-linear crystal, wherein the longitudinal mode-scrambling modulates the phase-matching condition and/or wavelength-dependent gain or losses of the OPO.

5. The method of claim 1, wherein the longitudinal mode-scrambling is carried out by using an intra-cavity electro-optic phase modulator, an intra-cavity electro-optic etalon, or a non-linear crystal, wherein the longitudinal mode-scrambling modulates a phase-matching condition and/or wavelength-dependent gain or losses of the OPO electro-optically.

6. The method of claim 1, further comprising the step of providing at least a second nonlinear crystal within the optical resonator, wherein the second crystal is configured to perform an additional process selected from the group of sum frequency generation, second harmonic generation, and optical parametric oscillation.

7. The method of claim 6, wherein the second crystal is configured to enable the light source to access additional wavelength ranges with broadband and/or multimode emission having a bandwidth greater than 300 GHz.

8. The method of claim 6, further comprising the step of providing a second pump source and pumping the second nonlinear crystal with the second pump source.

9. The method of claim 1, wherein the nonlinear crystal further comprises at least one of the group of a ferroelectrically poled chirped OPO crystal, a ferroelectrically poled crystal with multi-grating along the beam path, and a temperature gradient applied along a direction of the beam-propagation.

* * * * *